United States Patent
Carlough et al.

(10) Patent No.: US 9,940,199 B2
(45) Date of Patent: Apr. 10, 2018

(54) CHECKING ARITHMETIC COMPUTATIONS

(71) Applicant: INTERNATIONAL BUSINESS MACHINES CORPORATION, Armonk, NY (US)

(72) Inventors: Steven R. Carlough, Poughkeepsie, NY (US); Cedric Lichtenau, Stuttgart (DE); Silvia Melitta Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/803,710

(22) Filed: Jul. 20, 2015

(65) Prior Publication Data
US 2016/0019028 A1    Jan. 21, 2016

(30) Foreign Application Priority Data
Jul. 21, 2014    (GB) .................................... 1412875.5

(51) Int. Cl.
*G06F 11/14* (2006.01)
*G06F 7/48* (2006.01)

(52) U.S. Cl.
CPC ............... *G06F 11/14* (2013.01); *G06F 7/48* (2013.01)

(58) Field of Classification Search
None
See application file for complete search history.

(56) References Cited

U.S. PATENT DOCUMENTS

| | | | | |
|---|---|---|---|---|
| 5,018,093 | A * | 5/1991 | Shih | G06F 11/1608 708/533 |
| 5,880,982 | A * | 3/1999 | Evans | G06F 11/1497 708/200 |
| 6,158,021 | A | 12/2000 | Ziegler et al. | |
| 6,914,983 | B2 * | 7/2005 | Chen | G06F 7/722 380/28 |
| 7,412,475 | B1 * | 8/2008 | Govindarajulu | G06F 11/0763 708/530 |
| 7,933,696 | B2 | 4/2011 | Mayhew et al. | |
| 8,055,697 | B2 | 11/2011 | Patra | |
| 8,275,128 | B2 | 9/2012 | Nakagoe et al. | |
| 8,341,473 | B2 | 12/2012 | Bertacco et al. | |
| 8,566,383 | B2 | 10/2013 | Dao et al. | |
| 8,918,679 | B2 | 12/2014 | Janke et al. | |
| 2009/0248781 | A1 * | 10/2009 | Patra | G06F 7/49905 708/700 |
| 2013/0013656 | A1 | 1/2013 | Anderson et al. | |

(Continued)

OTHER PUBLICATIONS

International Search Report for GB1412875.5 dated Jan. 23, 2015, pp. 1-3.

(Continued)

*Primary Examiner* — David H Malzahn
(74) *Attorney, Agent, or Firm* — Heslin Rothenberg Farley & Mesiti P.C.

(57) ABSTRACT

Checking correctness of computations. An arithmetic logic unit circuit provides a computation result as a first number. The computation result is increased by a constant as a second number by the arithmetic logic unit circuit. A sum of the first number and the constant is compared to the second number, and an error is reported, if the comparing operation does not indicate an equal result.

20 Claims, 5 Drawing Sheets

(56) References Cited

U.S. PATENT DOCUMENTS

2013/0080843 A1* 3/2013 Stergiou ................. G06F 11/14
                                                                714/49
2016/0019028 A1* 1/2016 Carlough ................ G06F 11/14
                                                                708/671

OTHER PUBLICATIONS

Sheaffer et al., "A Hardware Redundancy and Recovery Mechanism for Reliable Scientific Computation on Graphics Professors," Proceedings of the 22nd ACM SIGGRAPH/EUROGRAPHICS Symposium on Graphics hardware. Aug. 2007, pp. 1-10.

* cited by examiner

CHECKING ARITHMETIC COMPUTATIONS

PRIOR FOREIGN APPLICATION

This application claims priority from the United Kingdom patent application number 1412875.5, filed Jul. 21, 2014, which is hereby incorporated herein by reference in its entirety.

BACKGROUND

One or more aspects of the present invention relate in general to data processing systems, and in particular, to checking correctness of computations of an arithmetic logic unit.

With the advances in circuit miniaturization and voltage reduction to save power, the probability of hard or soft errors during the lifetime of a circuit is rapidly increasing. This is disadvantageous for mission critical workload and becomes an issue for end users seeing their applications failing. Therefore, in arithmetic units for mission critical workload, some form of error detection in operations, such as addition, subtraction, multiplication, division, square root and convert operations, is employed. State of the art solutions to this problem often include the duplication of the operation (physically or timewise) with a comparison of both results, or using some form of residue checking Residue checking is performed within a checking flow by performing the same operations on the residue as those performed on the operands of the arithmetic unit. That is, a checking flow is performed in parallel to a data flow within the unit.

Power consumption of microprocessors on the other hand is an important concern. Arithmetic units consume a notable amount of power in the microprocessors. Therefore, power-saving techniques are employed to reduce the amount of power consumed by the arithmetic units within the microprocessors. Several problems occur in the conventional residue checking apparatus when power saving techniques are employed. For example, if a single check is performed, a conventional residue checking apparatus may be inoperable in a power saving mode because it's clocks have been temporarily disabled. The single check also needs to be disabled completely in the case of timing problems of the checking circuitry. In addition, a single point of failure may not be detected. Finally, the conventional residue checking apparatus may not be usable for complex operations within a multi-cycle pass such as divide, square root, and extended precision operations.

U.S. Pat. No. 8,566,383 B2, which is hereby incorporated herein by reference in its entirety, discloses a distributed residue checking apparatus for a floating point unit having a plurality of functional elements performing floating-point operations on a plurality of operands. The distributed residue checking apparatus includes a plurality of residue generators which generate residue values for the operands and the functional elements, and a plurality of residue checking units distributed throughout the floating point unit. Each residue checking unit receives a first residue value and a second residue value from respective residue generators and compares the first residue value to the second residue value to determine whether an error has occurred in a floating-point operation performed by a respective functional element.

U.S. Pat. No. 8,566,383 B2 further discloses a method of distributed residue checking of a floating point unit having a plurality of functional elements performing floating-point operations on a plurality of operands. The method includes generating residue values for the operands and the functional elements via a plurality of residue generators, distributing a plurality of residue checking units through the floating point unit, and receiving and comparing, via each residue checking unit, a first residue value and a second residue value from respective residue generators to determine whether an error has occurred in a floating-point operation performed by a respective functional element.

SUMMARY

Aspects of the invention provide a method and a data processing unit for checking correctness of computations of an arithmetic logic unit, which is efficient concerning additional resources, like physical space, power, cycle time and/or pipeline stages (latency) and costs.

A further aspect provides a data processing system for executing the method for checking correctness of computations of an arithmetic logic unit, which is efficient concerning resources, like physical space and power, and is fast enough to keep up with the clock rates of modern high-end processors.

According to one aspect of the invention, a method is provided for checking correctness of computations. The method includes, for instance, providing, by an arithmetic logic unit circuit, a computation result as a first number; providing by the arithmetic logic unit circuit, the computation result increased by a constant as a second number; comparing a sum of the first number and the constant to the second number; and reporting an error, based on the comparing not indicating a specified result (e.g., equal).

BRIEF DESCRIPTION OF THE DRAWINGS

Aspects of the present invention together with the above-mentioned and other objects and advantages may best be understood from the following detailed description of the embodiments, but not restricted to the embodiments, wherein is shown in.

DETAILED DESCRIPTION

Figure 1:
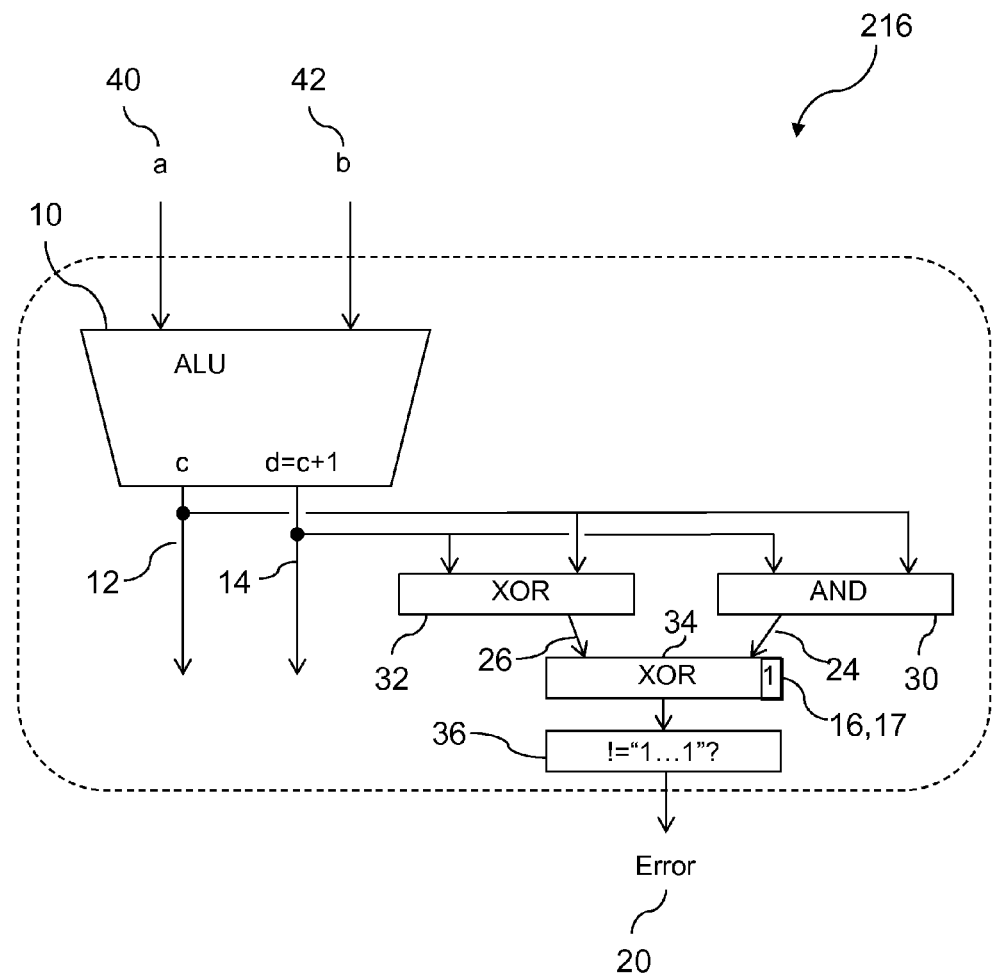
FIG. 1 a data processing unit comprising an arithmetic logic unit circuit, as well as electronic logic circuits for checking correctness of computations according to one embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention In FIG. 1, a data processing unit 216 including an arithmetic logic unit circuit 10, as well as electronic logic circuits for checking correctness of computations according to one embodiment of the invention, is shown. The method for checking correctness of computations of an arithmetic logic unit circuit 10, where the arithmetic logic unit circuit 10 is providing a computation result as a first number 12, includes providing the computation result increased by a constant 16, which is implemented as one in the embodiment depicted in FIG. 1, as a second number 14 by the arithmetic logic unit circuit 10, comparing a sum of the first number 12 and the constant 16 (one) to the second number 14, and reporting an error 20 if the comparing operation does not indicate an equal result. For instance, in the embodiment shown, this corresponds to a result of the comparison operation which differs from zero. The constant 16 (one) is added as an input 17 to the XOR gate 34.

The computation of the arithmetic logic unit circuit 10 may be one of an addition, a subtraction, a multiplication, a division, or any other arithmetic or logical operation. The first number 12 may be at least one of an integer number, a mantissa of a floating point number, an exponent of a floating point number, or other data containing numerical values.

The comparing operation of the method realized in FIG. 1 further comprises, as another embodiment, summing the first number 12 plus one as the constant 16, and the negated second number 14, and reporting an error 20 if the summing operation does not result to minus 1, which may be realized in the following: calculating bit-wise generate bits 24 and propagate bits 26 for the first number 12 and the negated second number 14, calculating a bit-wise exclusive-or for each of the obtained generate bits 24 and propagate bits 26, and reporting an error 20 if any exclusive-or results to zero.

For execution of one or more aspects as described above, the data processing unit 216, shown in FIG. 1, includes further electronic logic circuits for providing a computation result as a first number 12 and providing the computation result increased by a constant 16 (being one in the embodiment shown in FIG. 1) as a second number 14 by the arithmetic logic unit circuit 10, summing the first number 12, the negated second number 14 and the constant 16, and reporting an error 20 if the summing operation does not result to minus 1. As the constant is equal to one in the embodiment shown in FIG. 1, the data processing unit 216 therefore includes AND gates 30 for calculating bit-wise generate bits 24 and XOR gates 32 for calculating bit-wise propagate bits 26 for the first number 12 and the negated second number 14, XOR gates 34 for calculating a bit-wise exclusive-or for each of the obtained generate bits 24 and propagate bits 26, and an AND gate 36 for reporting an error 20 if any exclusive-or results to zero. Yet, it has to be mentioned, that propagate terms may also be created with OR-gates rather than with XOR-gates in most cases.

The data flow in the data processing unit 216 in FIG. 1 is as described in the following. The arithmetic logic unit circuit 10 being part of the data processing unit 216 receives two numbers as a first input 40 and a second input 42, which serve for calculation of a computation result by the arithmetic logic unit circuit 10 as a first number 12. To the first number 12 a number of one is added to result in a second number 14. The first number 12 is fed to AND gates 30 and XOR gates 32, as well as the second number 14. In the AND gates 30 generate bits 24 are bit-wise calculated and in the XOR (exclusive-or) gates 32 propagate bits 26 are bit-wise calculated and the results of both generate bits 24 and propagate bits 26 are fed to the XOR gates 34 for calculating the comparison data. A constant 16 of one is fed as input 17 to the XOR gates 34. The comparison data calculated by the XOR gates 34 are fed into the AND gate 36, which will report an error 20 if the AND gate 36 results to zero.

Figure 2:
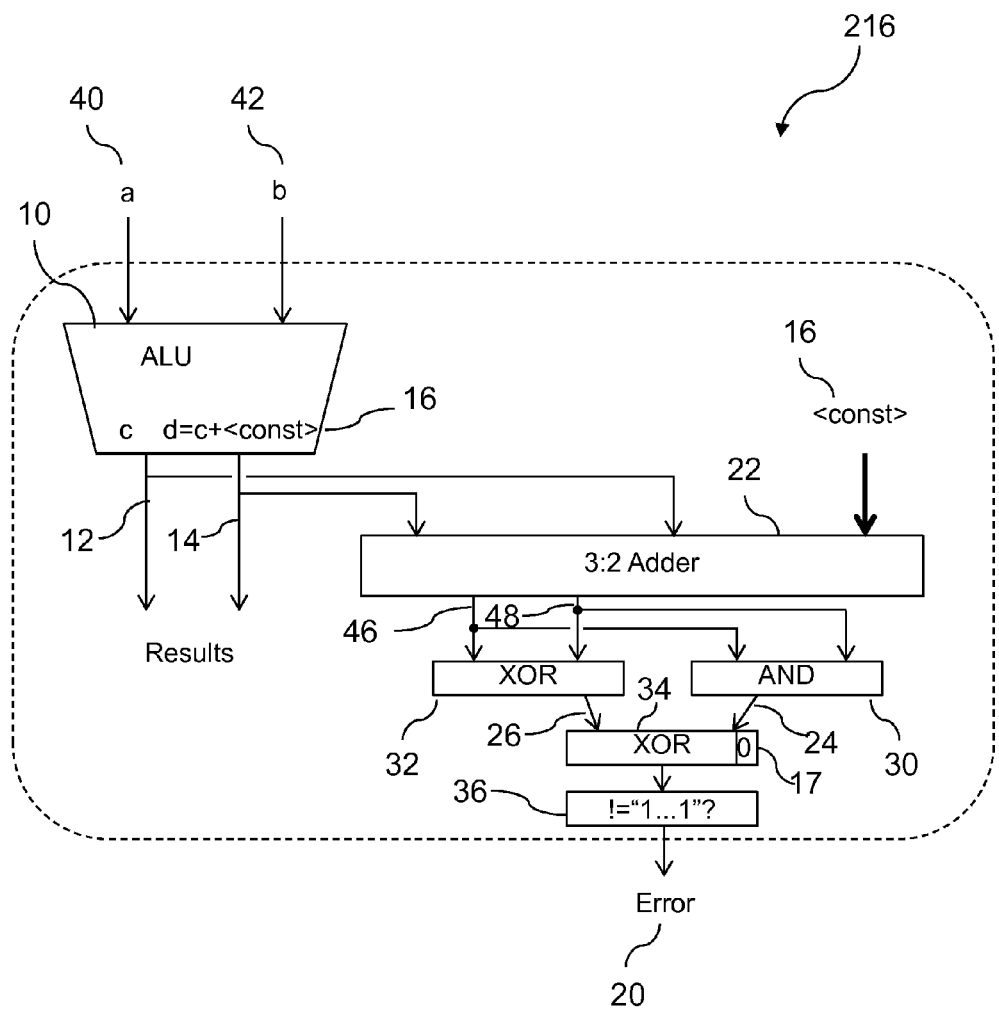
FIG. 2 a data processing unit comprising an arithmetic logic unit circuit, as well as electronic logic circuits for checking correctness of computations according to another embodiment of the invention.

FIG. 2 shows a data processing unit 216 including an arithmetic logic unit circuit 10, as well as electronic logic circuits for checking correctness of computations according to another embodiment of the invention, where not a constant 16 of one is used but any constant value <const>. One embodiment of the method for checking correctness of computations of an arithmetic logic unit circuit 10 is realized in the following: adding the first number 12, a negated second number 14 and the constant 16 in a 3:2 adding circuit 22, calculating bit-wise generate bits 24 and propagate bits 26 for the results of the 3:2 adding circuit 22, calculating a bit-wise exclusive-or for each of the obtained generate bits 24 and propagate bits 26, and reporting an error 20 if any exclusive-or results to zero. Therefore, the data processing unit 216 includes a 3:2 adding circuit 22 for adding the first number 12, the negated second number 14 and the constant 16, AND gates 30 for calculating bit-wise generate bits 24 and XOR gates 32 for calculating bit-wise propagate bits 26 for the results of the 3:2 adding circuit 22, XOR gates 34 for calculating a bit-wise exclusive-or for each of the obtained generate bits 24 and propagate bits 26, and an AND gate 36 for reporting an error 20 if any exclusive-or results to zero. As mentioned above, propagate terms may also be created with OR-gates rather than with XOR-gates in most cases.

The data flow in the data processing unit 216 in FIG. 2 is as described in the following. The arithmetic logic unit circuit 10 being part of the data processing unit 216 receives two numbers as a first input 40 and a second input 42, which serve for calculation of a computation result by the arithmetic logic unit circuit 10 as a first number 12. To the first number 12 a constant 16 is added to result in a second number 14. The first number 12 as well as the second number 14 and the constant 16 are fed to a 3:2 adder 22 in order to calculate a first output 46 and a second output 48. The first output 46 is fed to AND gates 30 and XOR gates 32, as well as the second output 48. In the AND gates 30 generate bits 24 are bit-wise calculated and in the XOR gates 32 propagate bits 26 are bit-wise calculated and the results of both generate bits 24 and propagate bits 26 are fed to the XOR gates 34 for calculating the comparison data. As the constant 16 in this embodiment is fed to the 3:2 adder, the input 17 of the XOR gates 34 is set to zero. The comparison data calculated by the XOR gates 34 are fed into the AND gate 36, which will report an error 20 if the AND gate 36 results to zero.

Figure 3:
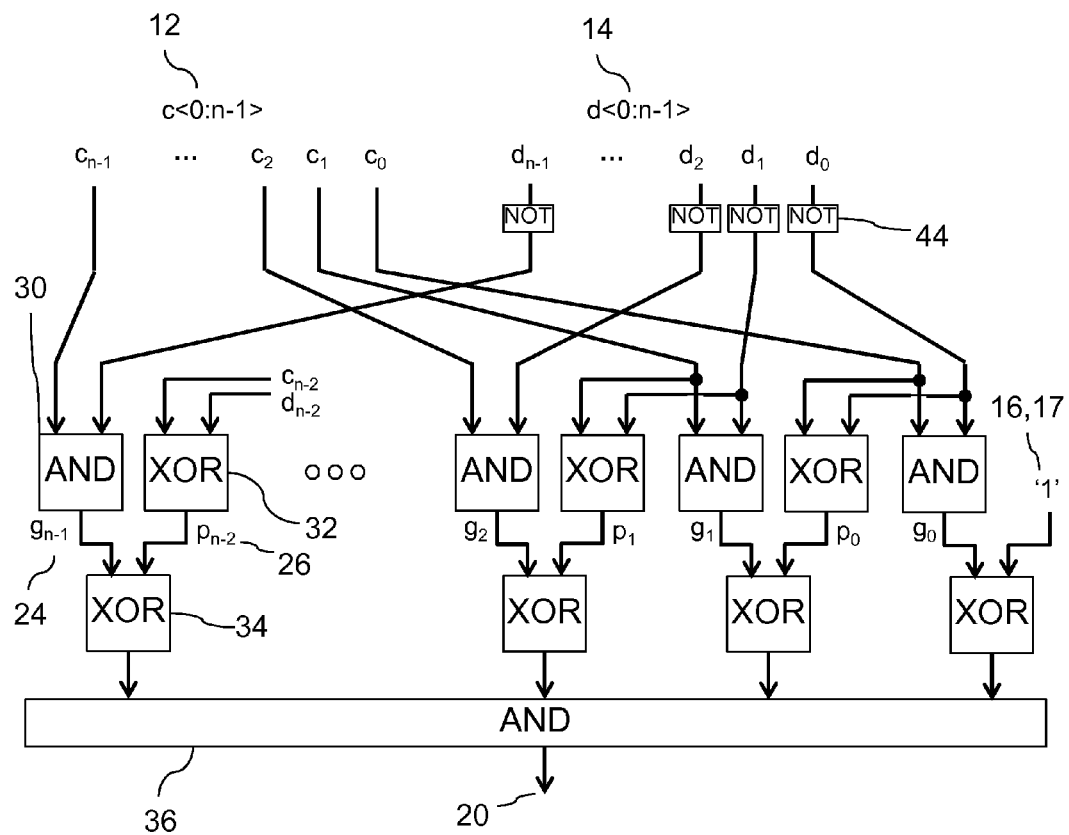
FIG. 3 a detailed view of the electronic logic circuits for checking correctness of computations of an arithmetic logic unit circuit according to the embodiment of FIG. 1.

In FIG. 3, a detailed view of the electronic logic circuits for checking correctness of computations of an arithmetic logic unit circuit 10 according to the embodiment of FIG. 1 are shown. The data flow is as described in the following. The first number 12 with a total length of n bits is fed bit-wise to AND gates 30 and XOR gates 32, as well as the second number 14 with a total length of n bits, which is negated before feeding it to the AND gates 30 and the XOR gates 32 by the NOT gates 44. In the AND gates 30 generate bits 24 are bit-wise calculated and in the XOR gates 32 propagate bits 26 are bit-wise calculated and the results of both generate bits 24 and propagate bits 26 are fed to the XOR gates 34 for calculating the comparison data. A constant 16 of one is also fed as input 17 to the XOR gates 34. The comparison data calculated by the XOR gates 34 are fed into the AND gate 36, which will report an error 20 if the AND gate 36 results to zero.

Figure 4:
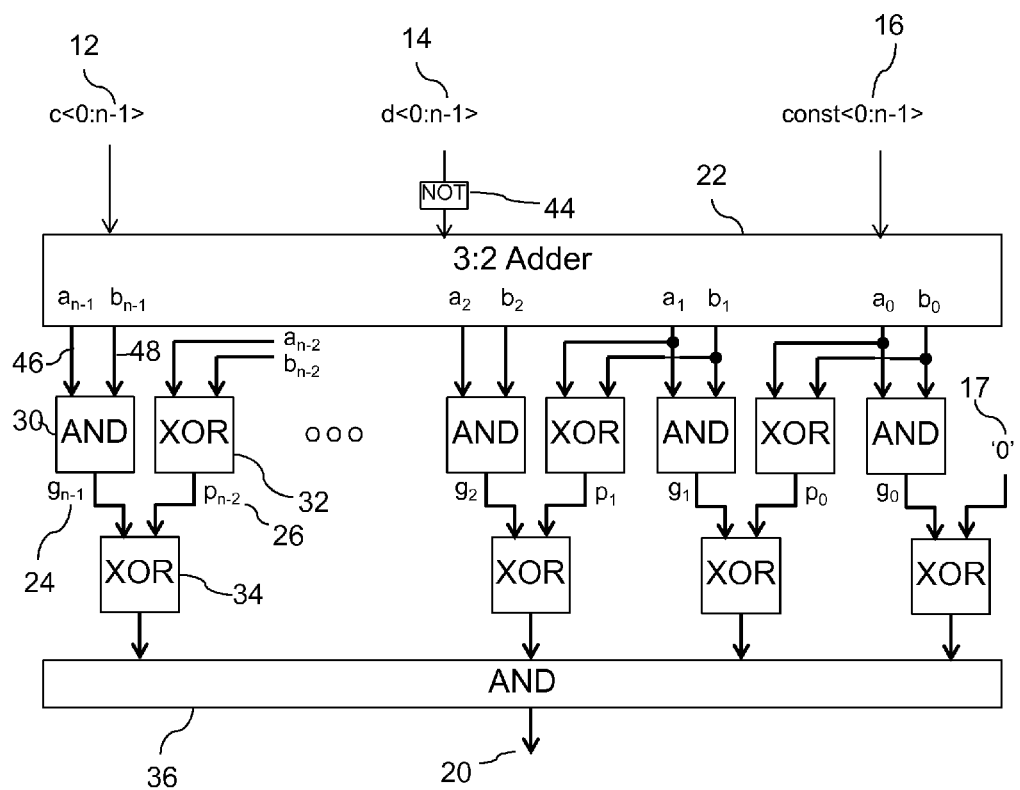
FIG. 4 a detailed view of the electronic logic circuits for checking correctness of computations of an arithmetic logic unit circuit according to the embodiment of FIG. 2.

FIG. 4 shows a detailed view of the electronic logic circuits for checking correctness of computations of an arithmetic logic unit circuit 10 according to the embodiment of FIG. 2, where not a constant 16 of one is used but a constant value <const>. The data flow is as described in the following. The first number 12 is fed bit-wise to AND gates 30 and XOR gates 32, as well as the second number 14, which is negated before feeding it to the AND gates 30 and the XOR gates 32 by the NOT gates 44. The constant 16 is also fed bit-wise to the 3:2 adder 22, in order to calculate a first output 46 and a second output 48, also bit-wise calculated. The first output 46 is fed to AND gates 30 and XOR gates 32, as well as the second output 48. In the AND gates 30 generate bits 24 are bit-wise calculated and in the XOR gates 32 propagate bits 26 are bit-wise calculated and the results of both generate bits 24 and propagate bits 26 are fed to the XOR gates 34 for calculating the comparison data. As the constant 16 in this embodiment is fed to the 3:2 adder, the input 17 of the XOR gates 34 is set to zero. The comparison data calculated by the XOR gates 34 are fed into the AND gate 36, which will report an error 20 if the AND gate 36 results to zero.

Figure 5:
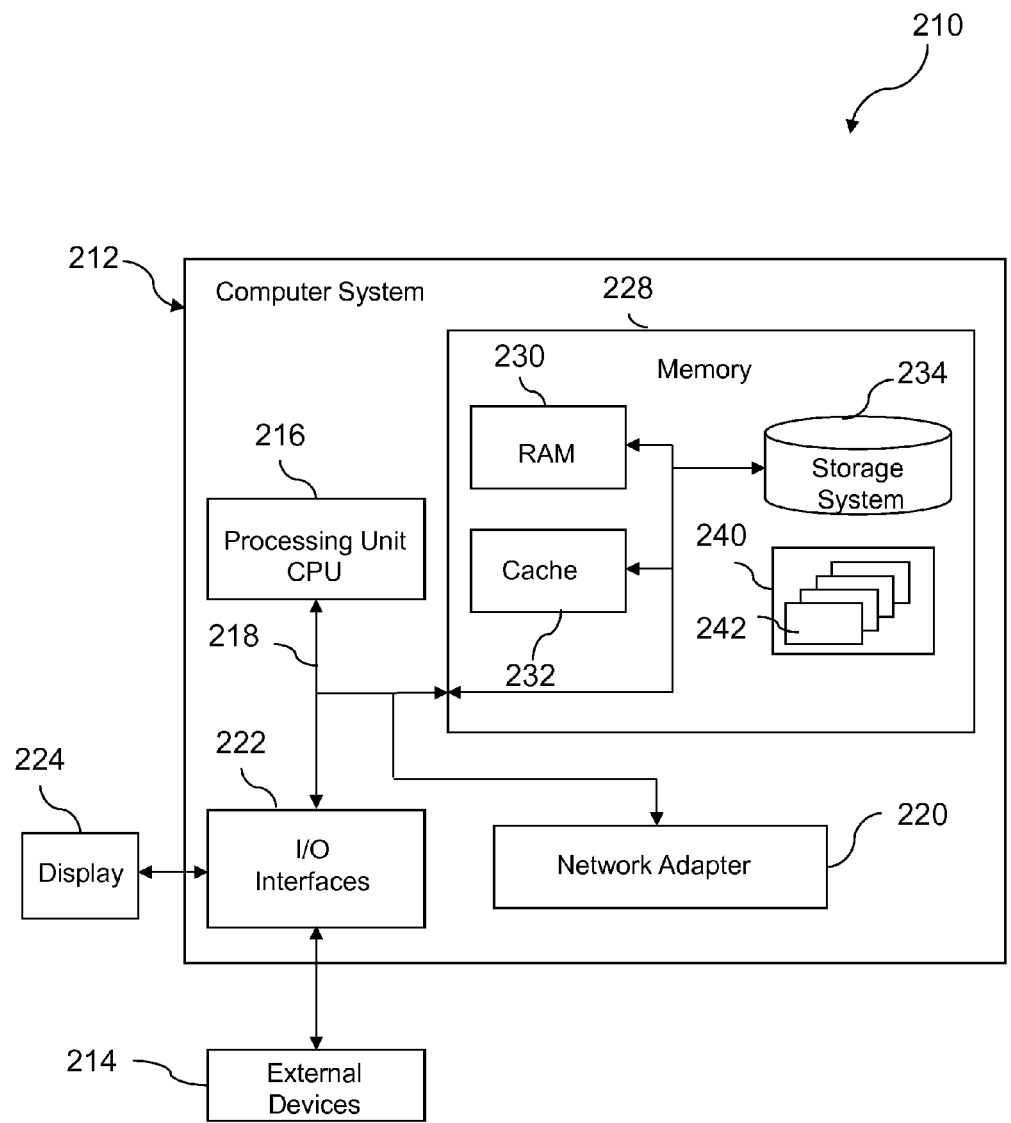
FIG. 5 an example embodiment of a data processing system for executing a method for checking correctness of computations of an arithmetic logic unit circuit according to an embodiment of the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

The data processing system 210 is capable of running a computer program product comprising a computer usable medium including a computer readable program, wherein the computer readable program when executed on a computer system 212 causes the computer system 212 to perform a method for checking correctness of computations of an arithmetic logic unit circuit 10 of a processing unit 216 as depicted in the previous figures, providing a computation result as a first number 12, comprising providing the computation result increased by a constant 16 as a second number 14 by the arithmetic logic unit circuit 10, comparing a sum of the first number 12 and the constant 16 to the second number 14, and reporting an error 20 if the comparing operation does not indicate an equal result.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data.

Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, according to a first aspect of the invention, a method is provided for checking correctness of computations of an arithmetic logic unit circuit, the arithmetic logic unit circuit providing a computation result as a first number. The method includes providing the computation result increased by a constant as a second number by the arithmetic logic unit circuit; comparing a sum of the first number and the constant to the second number; and reporting an error if the comparing operation does not indicate an equal result.

For reasons of reliability, arithmetic operations in data processing systems, especially in high end machines, are checked for correct results. With each technology shrink, soft error rates increase, which increases the need for the checking of computations for correctness. This applies to servers today, and in the future may apply to smaller components, such as mobile devices. These arithmetic computations include addition, subtraction, multiplication and division, but are not limited to these operations.

As the checking logic usually costs physical space and additional power, these resources may take the place of additional arithmetic logic, directly affecting the overall performance of a data processing system. Cycle time of the system as well may be affected by the checking logic. This would also affect the overall performance of a data processing system.

Usually, arithmetic logic units are computing arithmetic results c, where c is any number, as well as a result of c+1 in parallel for quick rounding reasons. In this case, this would normally double the checking requirements as both results are to be checked for correctness.

One or more aspects of the method allow reuse of computed results to check, for example, the two results c and c+1 used, e.g., for rounding purposes, with only very limited additional logic to a arithmetic logic unit. The checking logic physical size and depth is small compared to a technique that would use a standard residue method to provide this checking as there is no full adder required. Only three logic levels and an AND tree are sufficient for executing the method. Furthermore, the checking coverage is higher than standard residue solutions with moduli of 9, 3, or 5. For the case of not only checking the result c and c+1, but also c+<const>, where <const> is any constant, not necessarily equal to 1, an additional 3:2 adder may be used. This logic would be much smaller than the arithmetic logic it checks and adds limited additional logic compared to state of the art methods. One or more aspects of the method also exhibit advantages concerning the logic depth and the additional pipeline stages. One or more aspects of the method thus show significant advantages with respect to physical space and power needed and also with respect to timing implications.

One or more aspects of the method exhibit significant advantages over the conventional checking methods where for example the logic is duplicated and simply a comparator is added at the end. This method would not significantly increase the timing, but would double the size of the logic resulting in a performance/area/power impact. One or more aspects of the method do not double the size of the logic but increases it by only a very limited degree. Another method would be to add residue logic parallel to the arithmetic logic to mimic the computing modulo x presenting similar disadvantage to the duplication method.

A further advantage of an aspect of the invention with respect to standard checking methods is that errors concerning a number of bits (more than one) may be more efficiently detected.

In one embodiment, the constant may be equal to one. As already explained above, a computation of c+1 may be used for performing rounding computations, which occurs quite frequently. Therefore, it is useful if such a rounding computation can be checked for correctness by one or more aspects of the method inherently.

According to one embodiment, for the comparing operation, the method may include summing the first number, the negated second number and the constant, and reporting an error if the summing operation does not result to minus 1 in two's complement representation. The reason for this embodiment is explained by the following equations.

$$C+\text{<const>}=d$$

$$C+\text{<const>}-d=0$$

$$C+\text{<const>}+\text{NOT}(d)+1=0$$

$$C+\text{<const>}+\text{NOT}(d)=-1$$

Here it is used that the subtraction of d is equivalent to the addition of NOT(d)+1. This may represent a very convenient and efficient way of implementing one or more aspects of the method saving space and power resources in a data processing system. An advantage of this embodiment is that the comparison may be executed without using a calculation of carry bits, thus optimizing hardware requirements for one or more aspects of the method.

Advantageously, one or more aspects of the method may include the following for execution: adding the first number, the negated second number and the constant in a 3:2 adding circuit, calculating bit-wise generate bits and propagate bits for the results of the 3:2 adding circuit, calculating a bit-wise exclusive-or for each of the obtained generate bits and propagate bits, and reporting an error if any exclusive-or results to zero. This represents a possible embodiment for the execution of one or more aspects of the method in an arithmetic logic unit circuit of a data processing system, demonstrating a very efficient way of implementing one or more aspects of the method with using only very limited additional resources concerning physical space and power.

In one embodiment, e.g., for the case the constant is equal to one as for rounding computations, the method may include calculating bit-wise generate bits and propagate bits for the first number and the negated second number, calculating a bit-wise exclusive-or for each of the obtained generate bits and propagate bits, and reporting an error if any exclusive-or results to zero. For this embodiment, the first addition of the first number, the negated second number and the constant may be omitted, as the constant one may be implemented directly in the circuit for the exclusive-or which represents a very efficient way of executing one or more aspects of the method.

According to embodiments, the computation of the arithmetic logic unit circuit may be one of an addition, a subtraction, a multiplication, a division, or any other arithmetic or logical operation. As mentioned above, one or more aspects of the method are not restricted to a single arithmetic operation, but contrarily, may be applied to different arithmetic computations as enumerated.

One or more aspects may include embodiments where the first number is at least one of an integer number, a mantissa of a floating point number, an exponent of a floating point number, or any other representation of a numerical value. Thus, one or more aspects may also be applied to any kind of numbers or parts of numbers or representations of numbers in a data processing system.

According to another aspect of the invention, a data processing unit is provided for performing a method according to one or more aspects of the invention, in which the data processing unit includes an arithmetic logic unit circuit and, further includes electronic logic circuits for providing a computation result as a first number and providing the computation result increased by a constant as a second number by the arithmetic logic unit circuit, summing the first number, the negated second number and the constant, and reporting an error if the summing operation does not result to minus 1. As explained above, the checking procedure according to one or more aspects of the invention may be expressed in this very convenient way, thus, saving space and power resources in a data processing unit. Thus, the data processing unit is able to perform the checking of computed results with limited overhead in cycle time.

In one embodiment, the data processing unit may include a 3:2 adding circuit for adding the first number, the negated second number and the constant, AND gates for calculating bit-wise generate bits and XOR gates for calculating bit-wise propagate bits for the results of the 3:2 adding circuit, XOR gates for calculating a bit-wise exclusive-or for each of the obtained generate bits and propagate bits, and an AND gate for reporting an error if any exclusive-or results to zero. This represents a possible embodiment for the execution of one or more aspects in an arithmetic logic unit circuit of a data processing unit, demonstrating a very efficient way of implementing one or more aspects of the invention with using minimal additional resources concerning physical space and power. Yet, alternatively, propagate terms may also be created with OR-gates rather than with XOR-gates in most cases.

In a further embodiment, e.g., for the case the constant is equal to one as for rounding computations, the data processing unit may include AND gates for calculating bit-wise generate bits and XOR gates for calculating bit-wise propagate bits for the first number and the negated second number, XOR gates for calculating a bit-wise exclusive- or for each of the obtained generate bits and propagate bits, and an AND gate for reporting an error if any exclusive-or results to zero. For this embodiment, the first addition of the first number, the negated second number and the constant may be omitted, as the constant one may be implemented directly in the circuit for the exclusive-or which represents a very efficient way of executing one or more aspects of the invention. Yet, as mentioned above, propagate terms may also be created with OR-gates rather than with XOR-gates in most cases.

According to a further aspect of the invention, a data processing program for execution in a data processing system is provided including an implementation of an instruction set for performing a method as described above when the data processing program is run on a computer.

Further, a computer program product is provided including a computer usable medium including a computer readable program, wherein the computer readable program when executed on a computer causes the computer to perform a method for checking correctness of computations of an arithmetic logic unit circuit providing a computation result as a first number, comprising providing the computation result increased by a constant as a second number by the arithmetic logic unit circuit, comparing a sum of the first number and the constant to the second number, and reporting an error if the comparing operation does not indicate an equal result.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire connection, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

In a further aspect of the invention, a data processing system for execution of a data processing program is provided, including software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method of checking correctness of computations, the method comprising:
    providing, by an arithmetic logic unit circuit, a computation result as a first number;
    providing, by the arithmetic logic unit circuit, the computation result increased by a constant as a second number;
    comparing a sum of the first number and the constant to the second number; and
    reporting an error, based on the comparing not indicating an equal result.

2. The method according to claim 1, wherein the constant is equal to one.

3. The method according to claim 1, wherein the comparing further comprises summing the first number, a negated second number and the constant; and wherein the reporting further comprises reporting the error, based on the summing not resulting to minus 1.

4. The method according to claim 1, further comprising:
    adding the first number, a negated second number and the constant in a 3:2 adding circuit;
    calculating bit-wise generate bits and propagate bits for the results of the 3:2 adding circuit;
    calculating a bit-wise exclusive-or for each of the obtained generate bits and propagate bits; and
    reporting the error, based on an exclusive-or resulting to zero.

5. The method according to claim 1, further comprising:
    calculating bit-wise generate bits and propagate bits for the first number and a negated second number;
        calculating a bit-wise exclusive-or for each of the obtained generate bits and propagate bits; and
        reporting the error, based on an exclusive-or resulting to zero.

6. The method according to claim 1, wherein the computation of the arithmetic logic unit circuit is one of an addition, a subtraction, a multiplication, a division, or any other arithmetic or logical operation.

7. The method according to claim 1, wherein the first number is at least one of an integer number, a mantissa of a floating point number, an exponent of a floating point number, or any other representation of a numerical value.

8. A data processing unit for checking correctness of computations, the data processing unit comprising:
    one or more circuits to perform a method, the method comprising:
        providing, by an arithmetic logic unit circuit, a computation result as a first number;
        providing, by the arithmetic logic unit circuit, the computation result increased by a constant as a second number;
        comparing a sum of the first number and the constant to the second number; and
        reporting an error, based on the comparing not indicating an equal result.

9. The data processing unit according to claim 8, further comprising:
    a 3:2 adding circuit to add the first number, a negated second number and the constant;
    one or more AND gates to calculate bit-wise generate bits and one or more XOR gates to calculate bit-wise propagate bits for results of the 3:2 adding circuit;
    one or more XOR gates to calculate a bit-wise exclusive-or for each of the obtained generate bits and propagate bits; and
    an AND gate for reporting an error, based on an exclusive-or resulting to zero.

10. The data processing unit according to claim 8, wherein the constant is equal to one.

11. The data processing unit according to claim 8, further comprising:

one or more AND gates to calculate bit-wise generate bits and one or more XOR gates to calculate bit-wise propagate bits for the first number and a negated second number;

one or more XOR gates to calculate a bit-wise exclusive-or for each of the obtained generate bits and propagate bits; and an AND gate to report an error, based on an exclusive-or resulting to zero.

12. The data processing unit according to claim 8, wherein the computation of the arithmetic logic unit circuit is one of an addition, a subtraction, a multiplication, a division, or any other arithmetic or logical operation.

13. The data processing unit according to claim 8, wherein the first number is at least one of an integer number, a mantissa of a floating point number, an exponent of a floating point number, or any other representation of a numerical value.

14. A computer program product comprising a non-transitory computer readable storage medium including a computer readable program, wherein the computer readable program when executed on a computer system causes the computer system to perform a method for checking correctness of computations, the method including:

providing, by an arithmetic logic unit circuit, a computation result as a first number;

providing, by the arithmetic logic unit circuit, the computation result increased by a constant as a second number;

comparing a sum of the first number and the constant to the second number; and reporting an error, based on the comparing not indicating an equal result.

15. The computer program product according to claim 14, wherein the constant is equal to one.

16. The computer program product according to claim 14, wherein the comparing further comprises summing the first number, a negated second number and the constant; and wherein the reporting further comprises reporting the error, based on the summing not resulting to minus 1.

17. The computer program product according to claim 14, wherein the method further comprises:

adding the first number, a negated second number and the constant in a 3:2 adding circuit;

calculating bit-wise generate bits and propagate bits for the results of the 3:2 adding circuit;

calculating a bit-wise exclusive-or for each of the obtained generate bits and propagate bits; and reporting the error, based on an exclusive-or resulting to zero.

18. The computer program product according to claim 14, wherein the method further comprises:

calculating bit-wise generate bits and propagate bits for the first number and a negated second number;

calculating a bit-wise exclusive-or for each of the obtained generate bits and propagate bits; and reporting the error, based on an exclusive-or resulting to zero.

19. The computer program product according to claim 14, wherein the computation of the arithmetic logic unit circuit is one of an addition, a subtraction, a multiplication, a division, or any other arithmetic or logical operation.

20. The computer program product according to claim 14, wherein the first number is at least one of an integer number, a mantissa of a floating point number, an exponent of a floating point number, or any other representation of a numerical value.

* * * * *